US009482805B2

(12) United States Patent
Xiong et al.

(10) Patent No.: US 9,482,805 B2
(45) Date of Patent: Nov. 1, 2016

(54) BACKLIGHT MODULE AND DISPLAY DEVICE THEREOF

(71) Applicant: Shenzhen China Star Optoelectronics Technology Co., Ltd., Shenzhen, Guangdong (CN)

(72) Inventors: Chong Xiong, Shenzhen (CN); Kuang-yao Chang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 978 days.

(21) Appl. No.: 13/807,742

(22) PCT Filed: Dec. 5, 2012

(86) PCT No.: PCT/CN2012/085986
§ 371 (c)(1),
(2) Date: Dec. 30, 2012

(87) PCT Pub. No.: WO2014/082325
PCT Pub. Date: Jun. 5, 2014

(65) Prior Publication Data
US 2015/0253485 A1    Sep. 10, 2015

(30) Foreign Application Priority Data

Nov. 29, 2012 (CN) .......................... 2012 1 0499625

(51) Int. Cl.
F21V 8/00 (2006.01)
G02F 1/1333 (2006.01)
G02F 1/1335 (2006.01)

(52) U.S. Cl.
CPC ............. G02B 6/0035 (2013.01); G02B 6/005 (2013.01); G02B 6/0051 (2013.01);

(Continued)

(58) Field of Classification Search
CPC .. G02B 6/0035; G02B 6/005; G02B 6/0051; G02B 6/0053; G02B 6/0068; G02B 6/0073; G02B 6/0088; G02F 1/33308; G02F 1/133308; G02F 1/133615; G02F 2001/133317
See application file for complete search history.

(56) References Cited

U.S. PATENT DOCUMENTS 8,605,229 B2 * 12/2013 Park ..................... G02B 6/0031
349/113
9,010,980 B2 * 4/2015 Hu ....................... G02B 6/0055
362/609

(Continued)

FOREIGN PATENT DOCUMENTS

CN    101017274 A    8/2007
CN    102661573 A    9/2012

*Primary Examiner* — Mary Ellen Bowman
(74) *Attorney, Agent, or Firm* — Andrew C. Cheng (57) ABSTRACT

The present invention provides a backlight module and display device thereof, including light-guiding plate, frame and a plurality of light sources disposed near incident surface of the light-guiding plate. The backlight module further includes an opaque layer, with one part attached to the frame and the other part disposed on light-emitting surface of light-guiding plate. The opaque layer shields and absorbs partial light emitted directly from the plurality of light sources and light from light-emitting surface covered by opaque layer. With such structure, the rim of the frame can be smaller, even when A/P ratio is less than 0.5, the hotspot phenomenon can be avoided. As such, the present invention improves the optical characteristics of the backlight module and the display quality of the display device, as well as simplifies the assembly and reduces assembly cost.

14 Claims, 5 Drawing Sheets

(52) U.S. Cl.
CPC .......... *G02B 6/0053* (2013.01); *G02B 6/0068* (2013.01); *G02B 6/0073* (2013.01); *G02B 6/0088* (2013.01); *G02F 1/133308* (2013.01); *G02F 1/133615* (2013.01); *G02F 2001/133317* (2013.01)

(56) References Cited

U.S. PATENT DOCUMENTS

| | | | | |
|---|---|---|---|---|
| 2006/0050198 A1* | 3/2006 | Kirita | ............... | G02F 1/133621 349/61 |
| 2006/0103774 A1* | 5/2006 | Han | ............... | G02F 1/133385 349/58 |
| 2008/0291356 A1* | 11/2008 | Kim | ............... | G02F 1/133615 349/58 |
| 2012/0163020 A1* | 6/2012 | Inada | ............... | G02B 6/006 362/606 |
| 2012/0200796 A1* | 8/2012 | Harayama | ............... | G02F 1/133308 349/43 |
| 2013/0063978 A1* | 3/2013 | Gettemy | ............... | G02B 6/0031 362/609 |
| 2014/0036541 A1* | 2/2014 | Takada | ............... | G02B 6/0068 362/613 |

\* cited by examiner

BACKLIGHT MODULE AND DISPLAY DEVICE THEREOF

BACKGROUND OF THE INVENTION

1. Field of the Invention

The present invention relates to the field of liquid crystal displaying techniques, and in particular to a backlight module and display device thereof.

2. The Related Arts

In liquid crystal display devices (LCD), backlight module is a key component of a liquid crystal display device. The main function of the backlight module is to provide a light source with sufficient luminance and uniform distribution so that the liquid crystal panel can display images normally.

Figure 1:
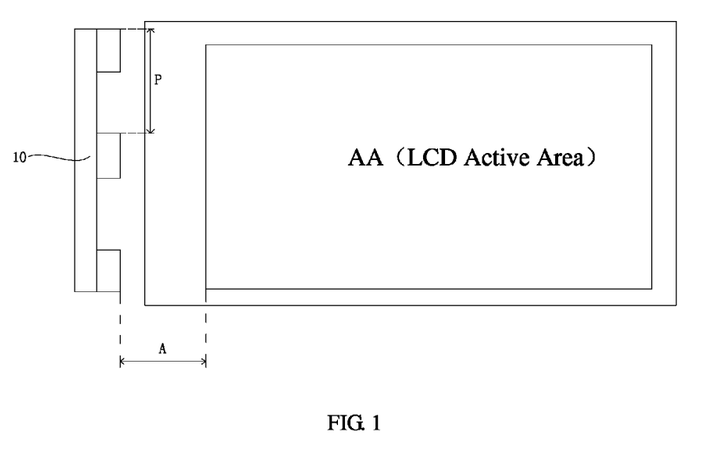
FIG. 1 is a schematic view showing the edge-lit LED backlight source of the backlight module of a known LCD.

In general, the LED backlight source of the backlight module is categorized as direct-lit type or edge-lit type. FIG. 1 is a schematic view showing the edge-lit LED backlight source of the backlight module of a known LCD, which comprises an LED light bar 10 and the active area (AA) of the LCD. A is the length from LED light to AA, and P is the distance between two adjacent LEDs. The ratio A/P is usually greater than 0.5. However, in the backlight module with edge-lit LED backlight, the A becomes smaller as the frame rim of the backlight module narrows. When A/P ration is less than 0.5, a hotspot phenomenon will appear, which severely affect the optical characteristics of the backlight module and the display quality of the display device.

SUMMARY OF THE INVENTION

The technical issue to be addressed by the present invention is to provide a backlight module and display device thereof, which is characterized in narrow frame rim, A/P<0.5 and able to avoid hotspot phenomenon.

The present invention provides a backlight module, which comprises: a light-guiding plate, a frame and a plurality of light sources; the plurality of light sources being disposed near an incident surface of the light-guiding plate, the backlight module further comprising an opaque layer, one part of the opaque layer being attached to the frame, and the other part being disposed on a light-emitting surface of the light-guiding plate; the opaque layer shielding and absorbing partial light emitted directly from the plurality of the light sources and light from the light-emitting surface covered by the opaque layer.

According to a preferred embodiment of the present invention, the other part of opaque layer has a width satisfying the following equation:

$$d > T^* \tan(\arcsin(1/n))$$

wherein d is the width of the other part of the black plastic; T is the thickness of the light-guiding plate; and n is the index of refraction of the light-guiding plate.

According to a preferred embodiment of the present invention, the backlight module further comprises a multi-layer optical film set, the frame fixes and holds the multi-layer optical film set; the optical film set comprises: lower diffuser, a prism, and an upper diffuser; the lower diffuser is disposed on the light-emitting surface of the light-guiding plate at a location no covered by the opaque layer, the prism and the upper diffuser are disposed in sequence on the opaque layer and the lower diffuser.

According to a preferred embodiment of the present invention, the backlight module further comprises a multi-layer optical film set; the optical film set comprises: lower diffuser, a prism, and an upper diffuser; the lower diffuser is disposed on the light-emitting surface of the light-guiding plate at a location no covered by the opaque layer, the prism and the upper diffuser are disposed in sequence on the opaque layer and the lower diffuser.

According to a preferred embodiment of the present invention, the opaque layer is black plastic.

According to a preferred embodiment of the present invention, the black plastic is made of polyethylene terephthalate or polycarbonate.

According to a preferred embodiment of the present invention, the distance between inner rim and outer rim of the frame at least shields the opaque layer.

According to a preferred embodiment of the present invention, the plurality of light sources is an LED light bar.

The present invention provides a display device, which comprises: an outer frame, a display panel and the aforementioned backlight module, the backlight module being disposed correspondingly to the display panel; the outer frame fixing the display panel and the backlight module; wherein the backlight module comprising: a light-guiding plate, a frame and a plurality of light sources; the plurality of light sources being disposed near an incident surface of the light-guiding plate, characterized in that: the backlight module further comprising an opaque layer, one part of the opaque layer being attached to the frame, and the other part being disposed on a light-emitting surface of the light-guiding plate; the opaque layer shielding and absorbing partial light emitted directly from the plurality of the light sources and light from the light-emitting surface covered by the opaque layer.

According to a preferred embodiment of the present invention, the other part of opaque layer has a width satisfying the following equation:

$$d > T^* \tan(\arcsin(1/n))$$

wherein d is the width of the other part of the black plastic; T is the thickness of the light-guiding plate; and n is the index of refraction of the light-guiding plate.

According to a preferred embodiment of the present invention, the backlight module further comprises a multi-layer optical film set, the frame fixes and holds the multi-layer optical film set; the optical film set comprises: lower diffuser, a prism, and an upper diffuser; the lower diffuser is disposed on the light-emitting surface of the light-guiding plate at a location no covered by the opaque layer, the prism and the upper diffuser are disposed in sequence on the opaque layer and the lower diffuser.

According to a preferred embodiment of the present invention, the backlight module further comprises a multi-layer optical film set; the optical film set comprises: lower diffuser, a prism, and an upper diffuser; the lower diffuser is disposed on the light-emitting surface of the light-guiding plate at a location no covered by the opaque layer, the prism and the upper diffuser are disposed in sequence on the opaque layer and the lower diffuser.

According to a preferred embodiment of the present invention, the backlight module further comprises a multi-layer optical film set; the optical film set comprises: lower diffuser, a prism, and an upper diffuser; the lower diffuser is disposed on the light-emitting surface of the light-guiding plate at a location no covered by the opaque layer, the prism and the upper diffuser are disposed in sequence on the opaque layer and the lower diffuser.

According to a preferred embodiment of the present invention, the opaque layer is black plastic.

According to a preferred embodiment of the present invention, the black plastic is made of polyethylene terephthalate or polycarbonate.

According to a preferred embodiment of the present invention, the distance between inner rim and outer rim of the frame at least shields the opaque layer.

According to a preferred embodiment of the present invention, the plurality of light sources is an LED light bar.

The efficacy of the present invention is that to be distinguished from the state of the art. Through disposing an opaque layer over a plurality of light sources and light-guiding plate, with one part of the opaque layer attached to the frame and the other part disposed on a light-emitting surface of the light-guiding plate, the present invention can narrow the frame rim of the backlight module so that even when the A/P ratio is less than 0.5, the hotspot phenomenon can still be avoided. As such, the present invention improves the optical characteristics of the backlight module and the display quality of the display device, as well as simplifies the assembly and reduces assembly cost.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

For description of the technical means and result of the present invention, the following refers to the drawings and embodiments for detailed description, wherein the same number indicates the same part.

Figure 5:
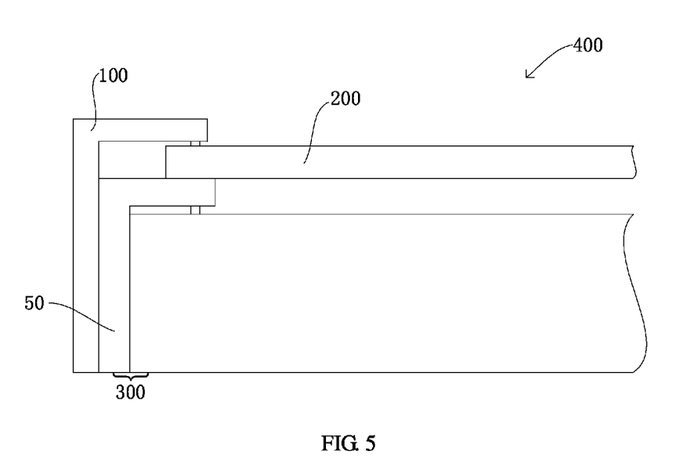
FIG. 5 is schematic view showing a structure of the display device in an embodiment of the present invention.

Referring to FIG. 5, FIG. 5 is schematic view showing a structure of the display device in an embodiment of the present invention. The display device 400 comprises an outer frame 100, a display panel 200 and a backlight module 300. A frame 50 fixes and holds the backlight module 300 formed by other optical components. The display panel 200 is placed on top of the frame 50, and then outer frame 100 and frame 50 are fixed on top of the backlight module 300.

The following describes the backlight module of the display device of the present invention in details.

Figure 2:
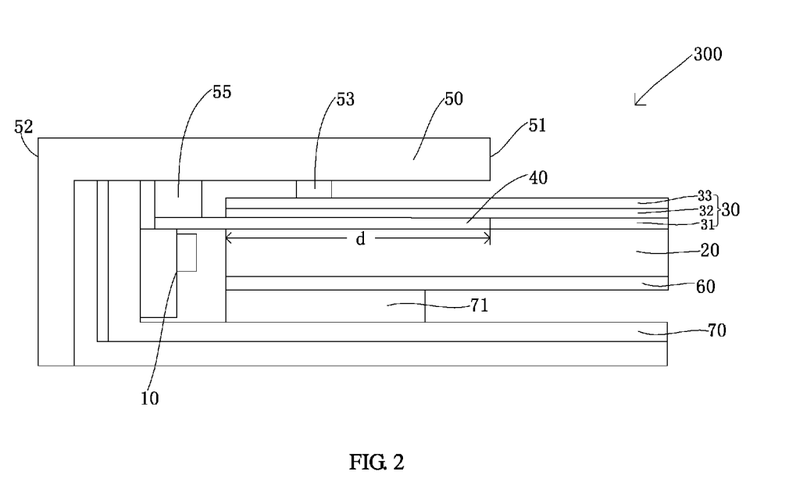
FIG. 2 is schematic view showing a structure of the backlight module in an embodiment of the present invention.
Figure 3:
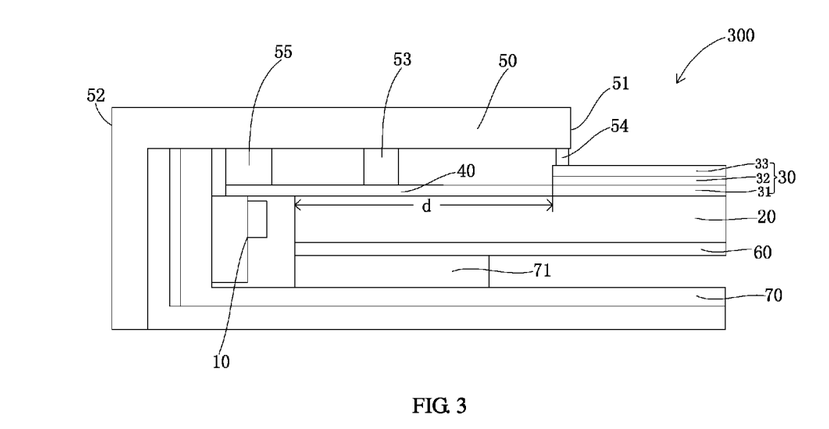
FIG. 3 is schematic view showing another structure of the backlight module in an embodiment of the present invention.
Figure 4:
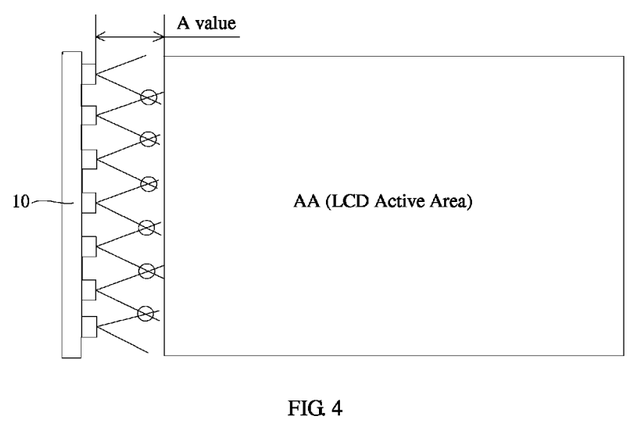
FIG. 4 is schematic view showing A value and hotspot occurring area of the backlight module in an embodiment of the present invention.

FIG. 2 and FIG. 3 show backlight module of the display device according to the present invention. The backlight module 300 comprises a backplane 70, a reflector 60 disposed on the backplane 70 through a support element 71, a light-guiding plate 20 disposed above the reflector 60 and opposite to an LED light bar 10, a frame 50 disposed outside of the backplane 70 and pressing against the light-guiding plate 20, an optical film set 30 disposed on a light-emitting surface of the light-guiding plate 20. In the instant embodiment, the optical film set 30 comprises: lower diffuser 31, a prism 32, and an upper diffuser 33. The opaque layer is preferably black plastic 40, with one part of the opaque layer is attached to an attachment element 55 of the frame 50, and the other part is disposed on a light-emitting surface of the light-guiding plate 20. The lower diffuser 31 is disposed on the light-emitting surface of the light-guiding plate 20 at a location no covered by the black plastic 40. The prism 32 and the upper diffuser 33 are disposed in sequence on the black plastic 40 and the lower diffuser 31, or only on the lower diffuser 31. With such structure, the distance between inner rim 51 and outer rim 52 of the frame 50 can be smaller, even when A/P ratio is less than 0.5, the hotspot phenomenon can be avoided in the AA of the display device (i.e., the AA in FIG. 4). As such, the optical characteristics of the backlight module and the display quality of the display device are improved.

The following is the preferred structures of the backlight module of the present invention. In these structures, the opaque layer is preferably black plastic.

FIG. 2 is schematic view showing a structure of the backlight module in an embodiment of the present invention. The backlight module 300 comprises a backplane 70, a reflector 60 disposed on the backplane 70 through a support element 71, a light-guiding plate 20 disposed above the reflector 60 and opposite to an LED light bar 10, a frame 50 disposed outside of the backplane 70 and pressing against the light-guiding plate 20, an optical film set 30 disposed on a light-emitting surface of the light-guiding plate 20. In the instant embodiment, the optical film set 30 comprises: lower diffuser 31, a prism 32, and an upper diffuser 33. One part of the black plastic 40 is attached to an attachment element 55 of the frame 50, and the other part is disposed on a light-emitting surface of the light-guiding plate 20 so that the black plastic 40 is located above the LED light bar and at a part of the light-emitting surface of the light-guiding plate 20. One side of the lower diffuser 31 is disposed tightly against one side of the black plastic 40 on the light-emitting surface of the light-guiding plate 20, covering the uncovered part of the light-emitting surface of the light-guiding plate 20. The prism 32 and the upper diffuser 33 are disposed in sequence on the black plastic 40 and the lower diffuser 31. The press element 53 of the frame 50 presses on top of upper diffuser 33 so as to completely press the optical film set 30 and black plastic 40 onto the light-guiding plate 20. With such structure, the distance between inner rim 51 and outer rim 52 of the frame 50 can be smaller, even when A/P ratio is less than 0.5, the hotspot phenomenon can be avoided in the AA of the display device (i.e., the AA in FIG. 4). In addition, during assembly, the black plastic 40 of preset size can be disposed directly in the above manner and then the other components of the optical film set are assembled. The process is simple and the assembly cost is reduced.

In the instant embodiment, the part of black plastic 40 covering the light-guiding plate 20 has a width satisfying the following equation (1):

$$d > T^* \tan(\arcsin(1/n)) \quad (1)$$

wherein d is the width of the black plastic 40 covering the light-guiding plate 20; T is the thickness of the light-guiding plate 20; and n is the index of refraction of the light-guiding plate 20. Only by satisfying the equation (1), the hotspot generated by the LED light bar 10 on the light-guiding plate 20 can be shielded.

In the instant embodiment, the black plastic 40 is made of polyethylene terephthalate (PET) or polycarbonate (PC), and is able to shield and absorb partial light emitted directly from the LED light bar 10 under cover of the black plastic 40 and light from the light-emitting surface covered by the black plastic 40 to avoid the leakage and hotspot phenomenon.

In the instant embodiment, the distance between inner rim 51 and outer rim 52 of the frame 50 at least shields the black plastic 40 to avoid exposing the black edges to affect the display effect.

FIG. 3 is schematic view showing another structure of the backlight module in an embodiment of the present invention. The difference between the present embodiment and the above embodiment is that in the present embodiment, one side of the lower diffuser 31 is disposed tightly against one side of the black plastic 40 on the light-emitting surface of the light-guiding plate 20, covering the uncovered part of the light-emitting surface of the light-guiding plate 20. The prism 32 and the upper diffuser 33 are disposed in sequence on the lower diffuser 31, but not on the black plastic 40. The press element 53 of the frame 50 presses on top of upper diffuser 33 and the holding element 54 of the frame 50 is held on the upper diffuser 33 so as to completely press the optical film set 30 and black plastic 40 onto the light-guiding plate 20. With such structure, the distance between inner rim 51 and outer rim 52 of the frame 50 can be smaller, even when A/P ratio is less than 0.5, the hotspot phenomenon can be avoided in the AA of the display device (i.e., the AA in FIG. 4). In addition, during assembly, the black plastic 40 of preset size can be disposed directly in the above manner and then the other components of the optical film set are assembled. The process is simple and the assembly cost is reduced.

Similarly, in the present embodiment, the part of black plastic 40 covering the light-guiding plate 20 has a width satisfying the following equation (1):

$$d > T^* \tan(\arcsin(1/n)) \quad (2)$$

wherein d is the width of the black plastic 40 covering the light-guiding plate 20; T is the thickness of the light-guiding plate 20; and n is the index of refraction of the light-guiding plate 20. Only by satisfying the equation (2), the hotspot generated by the LED light bar 10 on the light-guiding plate 20 can be shielded.

In the instant embodiment, the black plastic 40 is made of polyethylene terephthalate (PET) or polycarbonate (PC), and is able to shield and absorb partial light emitted directly from the LED light bar 10 under cover of the black plastic 40 and light from the light-emitting surface covered by the black plastic 40 to avoid the leakage and hotspot phenomenon.

In the instant embodiment, the distance between inner rim 51 and outer rim 52 of the frame 50 at least shields the black plastic 40 to avoid exposing the black edges to affect the display effect.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A backlight module, which comprises: a light-guiding plate, a frame and a plurality of light sources; the plurality of light sources being disposed near an incident surface of the light-guiding plate, the backlight module further comprising an opaque layer, one part of the opaque layer being attached to the frame, and the other part being disposed on a light-emitting surface of the light-guiding plate; the opaque layer shielding and absorbing partial light emitted directly from the plurality of the light sources and light from the light-emitting surface covered by the opaque layer; a second part of the opaque layer comprising black plastic and has a width satisfying the following equation: $d > T^* \tan(\arcsin(1/n))$ wherein d is the width of the second part of the opaque layer comprising black plastic; T is the thickness of the light guiding plate; and n is the index of refraction of the light-guiding plate.

2. The backlight module as claimed in claim 1, characterized in that the backlight module further comprises a multi-layer optical film set, the frame fixes and holds the multi-layer optical film set; the optical film set comprises: lower diffuser, a prism, and an upper diffuser; the lower diffuser is disposed on the light-emitting surface of the light-guiding plate at a location not covered by the opaque layer, the prism and the upper diffuser are disposed in sequence on the opaque layer and the lower diffuser.

3. The backlight module as claimed in claim 1, characterized in that the backlight module further comprises a multi-layer optical film set; the optical film set comprises:
lower diffuser, a prism, and an upper diffuser; the lower diffuser is disposed on the light-emitting surface of the light-guiding plate at a location not covered by the opaque layer, the prism and the upper diffuser are disposed in sequence on the opaque layer and the lower diffuser.

4. The backlight module as claimed in claim 1, characterized in that the opaque layer is black plastic.

5. The backlight module as claimed in claim 1, characterized in that the black plastic is made of polyethylene terephthalate.

6. The backlight module as claimed in claim 1, characterized in that the black plastic is made of polycarbonate.

7. The backlight module as claimed in claim 1, characterized in that the distance between inner rim and outer rim of the frame at least shields the opaque layer.

8. A display device, which comprises: an outer frame, a display panel and the aforementioned backlight module, the backlight module being disposed correspondingly to the display panel; the outer frame fixing the display panel and the backlight module; wherein the backlight module comprising: a light-guiding plate, a frame and a plurality of light sources; the plurality of light sources being disposed near an incident surface of the light-guiding plate, characterized in that: the backlight module further comprising an opaque layer, one part of the opaque layer being attached to the frame, and the other part being disposed on a light-emitting surface of the light-guiding plate; the opaque layer shielding and absorbing partial light emitted directly from the plurality of the light sources and light from the light-emitting surface covered by the opaque layer; a second part of the opaque layer comprising black plastic and has a width satisfying the following equation: d>T*tan(arcsin(1/n)) wherein d is the width of the second part of the opaque layer comprising black plastic; T is the thickness of the light guiding plate; and n is the index of refraction of the light-guiding plate.

9. The display device as claimed in claim 8, characterized in that the backlight module further comprises a multi-layer optical film set, the frame fixes and holds the multi-layer optical film set; the optical film set comprises: lower diffuser, a prism, and an upper diffuser; the lower diffuser is disposed on the light-emitting surface of the light-guiding plate at a location not covered by the opaque layer, the prism and the upper diffuser are disposed in sequence on the opaque layer and the lower diffuser.

10. The display device as claimed in claim 8, characterized in that the backlight module further comprises a multi-layer optical film set; the optical film set comprises: lower diffuser, a prism, and an upper diffuser; the lower diffuser is disposed on the light-emitting surface of the light-guiding plate at a location not covered by the opaque layer, the prism and the upper diffuser are disposed in sequence on the opaque layer and the lower diffuser.

11. The display device as claimed in claim 8, characterized in that the opaque layer is black plastic.

12. The display device as claimed in claim 8, characterized in that the black plastic is made of polyethylene terephthalate.

13. The display device as claimed in claim 8, characterized in that the black plastic is made of polycarbonate.

14. The display device as claimed in claim 8, characterized in that the distance between inner rim and outer rim of the frame at least shields the opaque layer.

* * * * *